March 22, 1960

T. B. GIBBS 2,929,909

ELECTRIC HEATING ELEMENT AND METHOD OF
AND APPARATUS FOR PRODUCING IT

Filed Feb. 15, 1957

Inventor.
Thomas B. Gibbs.

March 22, 1960  T. B. GIBBS  2,929,909
ELECTRIC HEATING ELEMENT AND METHOD OF
AND APPARATUS FOR PRODUCING IT
Filed Feb. 15, 1957  6 Sheets-Sheet 3

Inventor.
Thomas B. Gibbs.
By
Atty.

United States Patent Office 2,929,909
Patented Mar. 22, 1960

2,929,909

ELECTRIC HEATING ELEMENT AND METHOD OF AND APPARATUS FOR PRODUCING IT

Thomas B. Gibbs, Delavan, Wis., assignor, by mesne assignments, to The Goodyear Tire & Rubber Company, a corporation of Ohio Application February 15, 1957, Serial No. 640,387

9 Claims. (Cl. 219—46)

This invention relates to the art of retreading or recapping pneumatic tire casings and is particularly concerned with a heating element for use with a curing tube, either as a continuous circular element which is integral therewith or as a separate continuous circular heating element which is assembled with a curing tube, for insertion into a tire casing that is to be recapped in a vulcanizing machine; the heating element being effective to improve the vulcanizing operation by transferring heat radially outwardly to the bonding area or interface between the crown of the tire casing and the band of new rubber which is to be vulcanized thereto while heat is at the same time applied to the band of new rubber from the outside thereof. The invention is further concerned with a method of and apparatus for respectively producing such heating element and curing tube having such element as an integral part thereof.

Among the salient objects and features of the invention are, first, to provide a continuous circular flexible heating element for more efficient and reasonably accurate assembly with customary curing tubes circumferentially thereof; second, to provide a curing tube comprising a circumferentially extending continuous circular heating element forming an integral part thereof; third, to dispose the heating wire within the heating element in conductively continuous turns to provide for heat transfer uniformly throughout 360°; fourth to dispose the heating wire in undulating manner promoting flexibility thereof so as to guard against damage responsive to deformation of the heating element; fifth, to provide for the heating wire an insulation acting in the manner of a sleeve or sheathing which permits the wire therein to slide relative thereto, so that the wire can flex responsive to forces attempting deformation of the material of the heating element in which it is embedded; sixth, to use a so-called Balco wire for the heating wire, such wire providing for high initial temperature to effect quick and efficient heat transfer, the resistance of the wire thereafter increasing, thus reducing the energy required and at the same time appreciably shortening the time for the vulcanizing operation; seventh, to provide a method of and apparatus for making heating elements containing heating wires exhibiting the indicated features and properties; and eighth, to provide a novel plug and socket device for connecting the heating elements according to the invention with control circuit means therefor.

The various objects and features of the invention will be better appreciated after first briefly reviewing the prior art.

In prior methods, a tire casing on which the crown or tread has become thin through the effects of wear and service but is otherwise intact and in good serviceable condition, is stripped of part of the worn tread and a band of new rubber is placed thereon. An inflatable tube, termed curing tube, is inserted into the casing carrying the band of new rubber, and such casing, assembled with the curing tube, is placed into a circular steam-jacketed mold which surrounds the band of new rubber circumferentially. The mold is heated to the required temperature providing a vulcanizing temperature of about 290° to 300° F.—at which retreading compositions usually vulcanize—by passing steam or analogous heated fluid through its jacketed passages and the curing tube is thereupon inflated by compressed air, expanding within the casing and consequently pressing the crown thereof and therewith the band of new rubber radially outwardly against the heated mold surface to effect vulcanization of the band of new rubber, resulting in the molding of the tread into its finished form and uniting all parts firmly together.

The prior method briefly sketched above depends on heat transfer radially inwardly from the heated mold through the band of new rubber to the interface between the new rubber and the stripped crown of the casing and radially inwardly of the interface at which the band of new rubber is to be vulcanized to the casing. Accordingly, if the required firm vulcanized bond is to be effected between the band of new rubber and the stripped circumference of the casing, the proper vulcanizing temperature must obtain at the interface of these parts. There is, however, a temperature drop incurred in the transfer of heat from the mold radially inwardly, and cold spots result at areas of low temperature at the interface, due to condensation; accordingly, the temperature circumferentially of the band of new rubber where the tread is to be formed, must be applied for a longer time, that is, in excess of the normally required time, so as to provide the required vulcanizing temperature at the interface. The tread portion of the band of new rubber is thereby overcured, deteriorating its wearing quality, thus impairing its service and shortening its useful life.

Conversely, if the optimum vulcanizing temperature is maintained circumferentially of the tread portion of the band of new rubber, for the normal period of time, the tread will be properly cured, but the interface between the new rubber and the casing will receive insufficient and non-uniform heat and the bond between these parts will be faulty, with the result that the retread will tend to peel off, again impairing the service and shortening the useful life of the retreaded tire.

In order to remedy the above explained situation, it has been proposed to heat the casing from the inside by inflating the curing tube with live steam. The fluid pressure required inside of the curing tube to force the circumference of the band of new rubber with proper mechanical pressure radially outwardly against the mold is between 120 to 160 lbs. Live steam pressure of such magnitude would impart a temperature to the rubber much in excess of the desired and necessary vulcanizing temperature while lower pressure, for example, on the order of about 55 lbs., equivalent to about 302.9° F. at sea level, would be insufficient to produce the necessary radially outwardly effective mechanical pressure. It has been proposed, as a compromise, to inflate the curing tube with live steam at 55 lbs., to flash the steam pressure intermittently up to about 130 lbs., and to apply thereafter air at 120 to 160 lbs. In some cases, the steam was flushed from the curing tube with water.

The above noted procedure is cumbersome, requires for reasonably satisfactory results a great deal of experience, and is even with expertly trained operators uncertain in its results. Retreaded tires accordingly often fail to give the satisfactory service usually obtained from new tires. The steam used for inflating the curing tubes damages their structure and shortens their life.

To avoid these disadvantages, an improved method described in copending application Ser. No. 584,570, filed May 14, 1956, proposes to interpose an electrically heated belt-like element between the outside of the curing tube and the inside of the casing that is to be retreaded, extending theoretically circularly throughout 360° of these parts, for transferring heat radially outwardly to the interface between the stripped circumference of the casing and the inside of the band of new rubber placed thereon, while heat is being transferred to such interface radially inwardly through the material of the band of new rubber which is circumferentially heated by the steam heated mold. The intention is to compensate for the temperature drop incurred in the heat transfer in previous methods so as to heat to uniform optimum vulcanizing temperatures the interface between the outside of the stripped casing and the inside of the band of new rubber as well as the tread-forming portion of the new rubber.

The heating element disclosed in the copending application is a rubber belt having embedded therein a customarily insulated heating wire placed in convolutions forming straight flights extending transverse thereof. The belt is wrapped about a curing tube circumferentially thereof, while the curing tube is in non-inflated and, therefore, easily collapsible condition, the opposite ends of the belt overlapping, and the resulting assembly is inserted into a tire casing to be retreaded, which is thereupon positioned in the retread mold of a suitable vulcanizing machine. The ends of the heating wire embedded in the material of the belt are carried along the inside wall of the casing, threaded through a hole formed in an inner rim of the retreading machine, and are connected with a control circuit. The curing tube is thereupon inflated, pressing the heating belt against the inside of the casing to be retreaded, thus pressing the band of new rubber carried by the casing against the steam heated shaping mold. The control circuit provides for periodic switching on and off of current for the heating wire of the heating belt so as to heat the belt for the purpose of transferring heat radially outwardly to the interface between the casing and the band of new rubber while heat is at the same time transferred from the shaping mold radially inwardly through the band of new rubber. The removal of the curing tube and the heating belt, from the tire casing, after conclusion of the vulcanizing operation, requires the use of a tool such as a crowbar.

This prior structure and arrangement, which will be presently referred to again with reference to the drawings, exhibits several drawbacks which shall now be discussed, indicating at the same time the remedies provided by the present invention.

The assembly of the heating belt with a non-inflated and, therefore, easily collapsible curing tube and insertion thereof with the tube, into a casing to be retreaded, is a difficult task and cannot be effected with any assurance of having the heating belt in accurate position circumferentially of the curing tube. This will be appreciated upon considering that the parts must be forced into position in the tire casing, requiring squeezing and pushing manipulations which favor displacement of the heating belt with respect to the curing tube. Even a reasonably accurate placing of the heating belt circumferentially of the curing tube and proper overlapping alignment of the opposite ends of the belt are under such conditions merely a matter of chance. However, inaccurate placement of the heating belt circumferentially of the curing tube may impair the desired and necessary heat transfer radially outwardly to the interface where the band of new rubber must be bonded to the casing; inaccurate alignment of the overlapping ends of the heating belt may leave an angular area with insufficient heat or may heat such area excessively, depending on the particular overlap alignment obtained. In other words, if the overlap produces a gap between the heating wire convolutions contained in the belt at the opposite ends thereof, there will be an angular area which will be insufficiently heated; and if the overlap is such as to place heating wire convolutions contained in the belt at one end thereof on top of a similar convolution or convolutions contained in the belt at the other end thereof, there will be an angular area which will be excessively heated. Accordingly, the heat transferred to the tire casing will not be uniform throughout 360° and an angular area of the bond between the casing and the band of new rubber will either be undercured or overcured depending upon the prevailing overlap error. The corresponding undercured or overcured area will have poor wearing quality and will shorten the life of the retread.

The invention improves this situation by the provision of a continuous circular heating element containing a heating wire coiled therein in a number of circularly extending conductively continuous turns. The new heating element is cross-sectionally arcuate, approximating the curvature of the circumference of customary curing tubes, and can accordingly be placed on a curing tube with relative ease and greater accuracy than a heating belt of the type as disclosed in the copending application. The conductively continuous turns of the heating wire in the new heating element assure heat transfer uniformly throughout 360°.

In accordance with another feature of the invention, the new heating element may be incorporated in curing tubes as an integral part thereof. The assembly of the heating element with the curing tube is thereby eliminated; a curing tube of this kind, containing the heating element as an integral part thereof, is simply inserted into a tire casing to be retreaded and the casing is thereafter processed in the retreading mold of a vulcanizing machine. The proper position of the parts and uniform heat transfer throughout 360° are assured.

It will be understood, of course, that heating elements as well as curing tubes containing heating elements as integral parts thereof, will be made in different sizes in accordance with the sizes of tire casings to be retreaded.

As noted before, the removal of the curing tube and the heating belt according to the copending application, from the tire casing, after completion of the vulcanizing operation, requires the use of a crowbar or the like; use of such a tool will also be required for removing from a tire casing the curing element proposed according to the present invention. The corresponding tool must be manipulated to pry open the side walls of the tire casing and thereafter to apply leverage so as to lift the curing tube and associated heating element therefrom. This entails pushing and digging into the curing tube and digging into parts of the associated heating element, which can hardly be avoided, producing folds and kinks in the heating element, thereby placing stresses on the wires embedded therein which tend to stretch the wires and may cause rupture thereof or may rupture part of the insulation of the heating wire. Rupture of the heating wire will make the heating element permanently useless; rupture of part of the insulation of the wire will result during subsequent heating in bonding of the exposed wire portion to the surrounding rubber, carburizing part thereof and thereby shorten the life of the corresponding heating element.

The heating wire in the heating belt according to the previously mentioned copending application is disposed in convolutions forming straight flights extending transverse of the belt. A kink put in the belt by a crowbar applied to lift the assembly out of a tire casing constitutes a force acting perpendicular to the direction in which the straight flights of the wire convolutions extend, such force attempting to stretch the corresponding wire portions. Being straight and relatively firmly anchored in the surrounding rubber of the belt, these wire portions cannot stretch and may rupture, interrupting conductive continuity and making the corresponding heating belt useless. Part of the customary insulation of the heating wire may rupture and shorten the life of the heating belt.

The invention avoids the above mentioned drawbacks first, by disposing the heating wire in undulating fashion and, second, by surrounding it with an insulating sleeve or sheathing made of at least one and preferably two layers of glass braid insulation. The glass braid provides surfaces for sliding engagement with the wire. The wire can thus move within and relative to its insulating sheathing and, due to its undulating disposition within the heating element it can flex in any direction responsive to kinking or other deformation of the element due to any cause, including kinking due to force applied by a crowbar. The invention accordingly provides for full flexibility of the heating wire, thereby eliminating the danger of damage, rupture or bonding of the wire to the surrounding rubber of the heating element.

The glass braid insulation results in additional advantages. It increases the contact area with the surrounding rubber of the heating element, thereby reducing the temperature at the contact area. The heat transferred from the heated wire to the surrounding glass braid insulation is largely radiant heat and the heat transferred from the glass braid insulation to the surrounding rubber is substantially conduction heat. The advantage is that the heating wire may be heated to higher initial temperature than in prior structures without disintegrating the surrounding rubber of the heating element while providing quicker and more efficient heat transfer and thereby appreciably reducing the vulcanizing times as compared with the times required in previously known structures and procedures.

The invention proposes in accordance with a further feature, to use Balco wire as a heating wire encased in glass braid insulation. Such wire provides for the initially desired high temperature to effect quick initial heat transfer to the bonding area, the resistance thereafter increasing, requiring less energy for the completion of the vulcanizing operation.

It is understood that the use of a heating wire constructed, insulated and disposed as indicated above is not inherently limited to heating elements for retreading tire casings. All or some of the corresponding features may be advantageously applied in connection with heavy duty heating elements for other purposes.

Another drawback of the structure according to the prior co-pending application resides in operations required to connect the heating wire of the belt-like heating element with the control circuit therefor. For this purpose, the ends of the heating wire, extending from the belt wrapped about a curing tube circumferentially thereof, must be guided to the outside by threading them along a side wall of the curing tube abutting an inner wall of the tire casing and thereafter through a hole formed in an inner rim of the vulcanizing machnie which holds the tire casing in place with the band of new rubber facing the steam heated tread shaping mold.

The invention proposes to provide, for use with a continuous circular heating element which is to be assembled with a curing tube circumferentially thereof, a flat terminal cable portion vulcanized to the heating element and containing terminal wires connected respectively with the ends of the heating wire embedded in the heating element. This flat terminal cable portion tapers into a sturdy round cable portion carrying a plug for connection with the control circuit. The terminal wires embedded in the flat as well as in the round cable portions may be insulated with glass braid to preserve full flexibility thereof.

In the case of a curing tube comprising a continuous circular heating element as an integral part thereof, the invention proposes a tubular socket which may be vulcanized to the curing tube, surrounding the stem of the usual air valve, the socket containing contacts connected with terminal wires which are embedded in the side walls of the curing tube and respectively connected with the corresponding ends of the heating wire of the heating element disposed circumferentially of the curing tube. The terminal wires may be insulated and disposed in the side walls of the curing tube in a similar manner as the heating wire is disposed in the heating element; that is, they may be insulated by a layer or layers of glass braid and may extend in undulating fashion so as to preserve full flexibility or mobility to compensate for stresses placed thereon responsive to deformation of the side walls resulting, for example, due to the application of a tool such as a crowbar. A tubular plug is provided for cooperation with the socket, such plug containing complementary contacts connected with a cable containing wires extending to the control circuit.

The method of making heating elements according to the invention comprises in one embodiment, taking two sheets of raw rubber and moving said sheets through rotating drums, feeding a plurality of wire elements each insulated by one or more layers of glass braid for disposal between the two sheets of rubber, oscillating the wire elements in a direction transverse to the feed direction thereof so as to position the wire elements between the rubber sheets in undulating fashion and in mutually parallel transversally spaced relationship; determining the length of said rubber sheets having the insulating wire elements disposed therebetween to provide, when joined end to end, a circular structure of predetermined diameter, and cutting said sheets and wire elements to obtain a strip of a corresponding predetermined length composed of the two layers of raw rubber and said wire elements disposed therebetween; placing the opposite ends of said strip in mutually facing relationship, exposing wire portions at the opposite ends of the strip and conductively joining predetermined wires at one end of said strip with predetermined wires at the other end thereof and insulating said joined conductors to provide conductively continuous wire turns, terminating in two terminal wires; covering said joined and insulated conductors with strips of rubber extending transverse of the ends of the principal rubber sheets; connecting outgoing leads embedded in a flat terminal cable with said terminal wires; and heat treating the resulting structure including the flat terminal cable portion to obtain a continuous circular body with arcuate cross-section and feathered edges.

In another previously mentioned embodiment, as indicated before, the continuous circular heating element is incorporated in a curing tube forming circumferentially the crown thereof, and the outgoing leads are embedded in the walls of the curing tube and terminate in a tubular plug forming an integral part of the tube and surrounding the stem of the air valve thereof.

The apparatus for making heating elements in accordance with the above described method comprises means for carrying out the steps enumerated before.

Details of the invention will appear from the description which will be rendered below with reference to the accompanying drawings. In these drawings.

Fig. 17 shows in more or less diagrammatic elevational side view essential features of a machine for making the band unit shown in Figs. 11 to 13, with parts broken away to indicate details.

The drawings do not represent the parts true to scale but in more or less diagrammatic manner and in some instances with certain parts distorted with respect to other parts so as to bring out details. Like parts are numbered alike throughout the drawings.

Figures 1, 2:
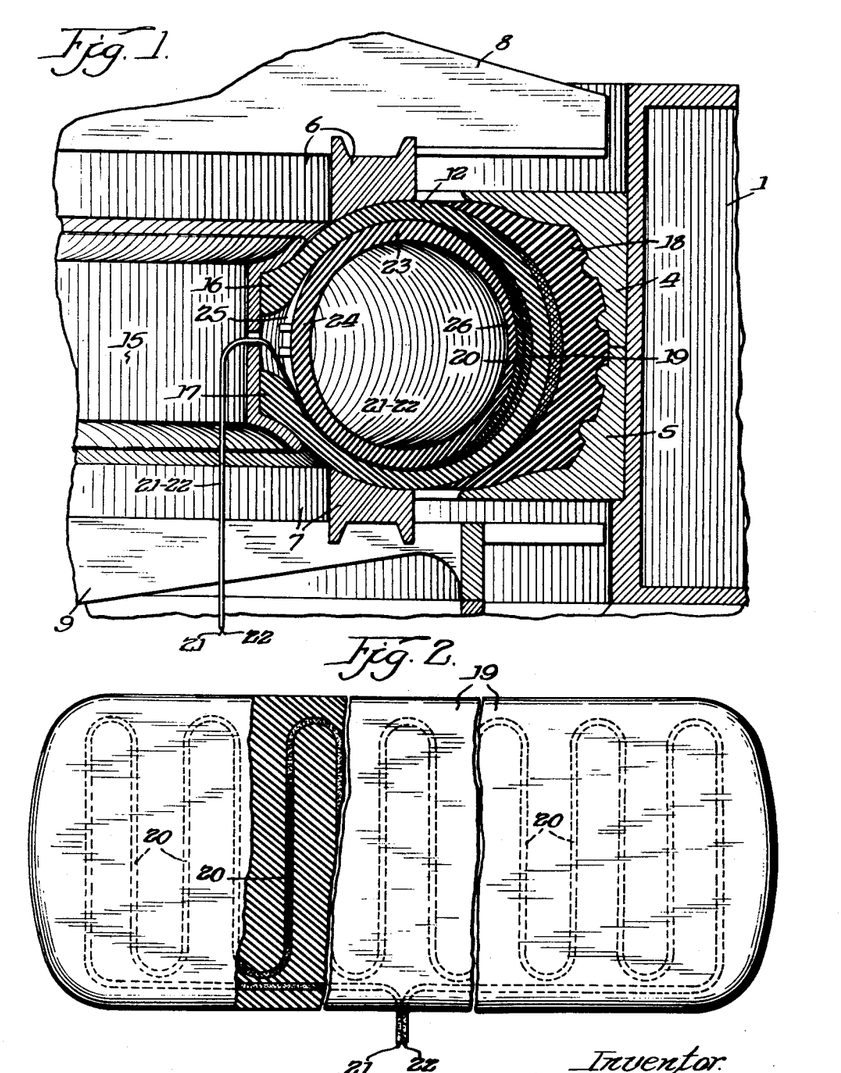
Fig. 1 is a fragmentary view of an arrangement according to the previously mentioned copending application Ser. No. 584,570, showing a curing tube assembled with a belt-like heating element disposed within a tire casing to be retreaded in a steam heated mold.
Fig. 2 shows the heating belt of the prior copending application.

Figs. 1 and 2 correspond respectively to Figs. 2 and 3 of the previously mentioned copending application Serial No. 584,570. They have been included herein as an aid for a better understanding of the operations involved in using the invention in the recapping or retreading of tire casings.

Fig. 1 shows parts of a known and suitable vulcanizing machine including a retread mold or matrix. The machine comprises means forming a steam chamber 1 provided with suitable steam inlet and outlet means (not shown), a tire capping matrix formed of two parts 4 and 5, and pressure rings or plates 6 and 7. A spider 8 carries the pressure plate 6 and a spider 9 carries the pressure plate 7. Some arms of the spiders 8 and 9 are provided with adjustable screws (not shown) for positioning the pressure plates 6 and 7 in proper relation to a tire casing 12 that is being retreaded. Suitable means (not shown) are provided for separating the matrix parts, that is, for lifting the matrix part 4 relative to matrix part 5, thus opening the mold for the purpose of inserting thereinto a tire casing to be retreaded and for thereafter forcing the spiders toward each other so that the pressure plates 6 and 7 will hold the side walls of the tire casing in proper position. Numeral 15 indicates an annular inner rim for holding the beads 16 and 17 of the tire casing in place.

The vulcanizing machine indicated in Fig. 1 merely constitutes a simple example of one of several differently constructed machines that may be used; other known machines in which the matrix parts are made in the form of hinged hydraulically controlled elements may likewise be employed. Accordingly, the parts of the vulcanizing machine form no part of the invention except insofar as they may cooperate in the retreading of tire casings with the heating elements according to the present invention and with parts cooperating therewith.

The tire casing 12 to be retreaded comprises the usual cord fabric side walls carrying the beads 16 and 17. The worn-out tread is in customary manner stripped from the casing and a band of new rubber 18 is placed thereon. This band is shown in its finished form with the tread molded thereon by vulcanizing.

The heating element of the previously mentioned prior application, shown in Fig. 2 and marked by numeral 19 is inserted into the tire casing as shown in Fig. 1. This element is a belt-like flexible structure made of rubber and the like, cross-sectionally of arcuate shape to approximate the contour of the inside of the tire casing, and embedded therein is a heating wire 20 which is insulated in usual manner. The ends of the heating wire extend from the belt-like structure as indicated at 21 and 22. The length of the belt corresponds theoretically to the developed length of the inner diameter of the tire casing. Accordingly, when inserted into the tire casing and held in its proper position therein, the belt should extend circularly inside the casing theoretically for full 360° along the angular area facing the crown portion. The ends and the longitudinally extending edges of the belt are tapered or feathered to facilitate insertion and placement relative to neighboring parts, with the ends in slight overlapping relationship.

The next element to be inserted is the curing tube 23. This tube is of generally known structure, comprising a wall portion 24, facing an intermediate inner rim 25 and a wall portion 26 facing the crown of the tire casing. The curing tube is inserted slightly inflated after insertion of the belt-like heating element 19. The ends 21, 22 of the heating wire are placed between the outside of the curing tube and the inside wall of the tire casing, threaded through a hole formed in the inner rim 15 to extend to the outside as shown in Fig. 1.

The tire casing 12 which is to be recapped, carrying the new rubber 18 and assembled with the heating element 19, the curing tube 23 and the intermediate rim 25, is placed into the retread mold, the inner rim 15 gripping the casing beads 16 and 17. The mold is thereupon closed and steam is passed through the steam chamber 1. The curing tube 23 is inflated, exerting pressure radially outwardly against the heating belt 19 and therewith against the crown portion of the casing, thus pressing the new rubber 18 against the inside of the matrix parts 4 and 5, which are heated to the desired vulcanizing temperature amounting to about 297° F. The terminal wires 21, 22 of the belt-like heating element are connected to a control device so as to heat the heating element, if desired intermittently, to produce heat which is transferred radially outwardly to the interface between the crown portion of the tire casing and the new rubber 18 surrounding it, while heat is at the same time transferred thereto through the new rubber. The vulcanizing operation is in this manner facilitated.

It will be readily realized from the foregoing explanations that the structure and procedure according to the prior application Serial No. 584,570 will cause the previously mentioned drawbacks including difficulties in the handling of the heating belt incident to its insertion into and removal from the tire casing; uncertainty as to correct positioning of the heating belt and therewith uncertainty as to the accuracy of applying heat correctly; difficulties in carrying the terminal wires extending from the heating belt to the outside for connection to control apparatus; and danger of damaging the heating wire in the belt due to force that has to be applied, for example, by a crowbar incident to assembly of the parts as well as incident to the separation thereof after the vulcanizing.

These difficulties and drawbacks resulting from the prior structure of the heating element (belt 19; Fig. 2) and from its handling to place it in position for vulcanizing (Fig. 1) and thereafter removing it, are overcome, and additional advantages are achieved by the invention which will now be described with reference to Figs. 3 to 18.

Figure 3:
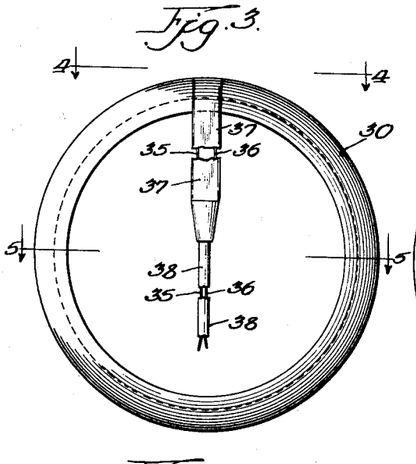
Fig. 3 shows in elevational side view a heating element according to the invention.
Figures 4, 5, 7:
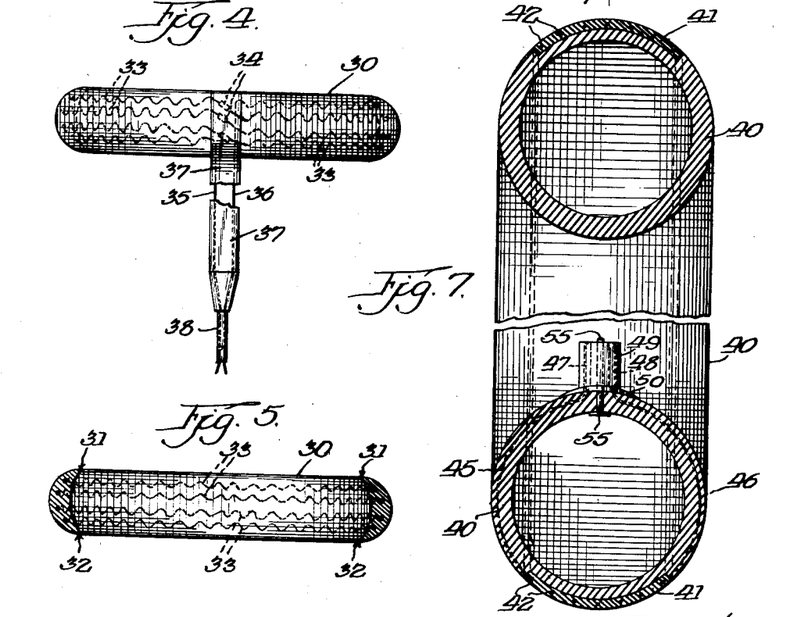
Fig. 4 is an elevational view of the heating element as seen when looking along line 4—4 in Fig. 3.
Fig. 5 shows a sectional view of the heating element taken approximately along 5—5 of Fig. 3.
Fig. 7 is a somewhat enlarged sectional view of the curing tube, taken along line 7—7 of Fig. 6.

Figs. 3 to 5 show a heating element according to one embodiment of the invention, made in the form of an endless, flexible, circular element made of rubber or rubber-like material, of cross-sectionally arcuate shape, as particularly indicated in Fig. 5, with feathered edges 31, 32, to approximate the curvature of the circumference of a curing tube and the curvature of the inner crown portion of a tire casing. This heating element will accordingly be used in a similar manner as the heating belt of the prior arrangement shown in Figs. 1 and 2.

The endless circular cross-sectionally curved structure of the heating element facilitates its correct assembly with a curing tube and likewise insertion of the curing tube, carrying the new heating element, in correct position into a tire casing to be recapped.

Embedded within the endless heating element 30, as indicated in Figs. 4 and 5, are turns of heating wire 33 extending in undulating parallel relationship. Four turns have been shown for convenience; more or fewer may be provided as desired or required. These turns are joined as indicated in Fig. 4 at 34 to form a heating coil with terminal wires 35, 36 extending therefrom. The heating wire is throughout its extent insulated by glass braid to retain at any point thereof mobility with respect to the surrounding parts. The manner in which the wire turns are respectively insulated, placed in undulating position, and joined to form a continuous heating wire will be presently described more in detail.

The undulating placement of the wire turns and the mobility of the wire within its glass braid insulation minimizes the danger of rupture of the wire due, for example, to the application of a crowbar incident to insertion into and removal of the heating element (assembled with a curing tube) from a tire casing. It will be readily appreciated that the undulating disposition of the wire turns will permit expansion and contraction at any point at which a tool such as a crowbar should be forced into the structure. The mobility of the wire, at any point within its glass braid insulation, greatly enhances this feature. As will be presently brought out, the glass braid insulation according to the invention also improves the heat transfer from the heating element to the bonding area, namely, to the interface between the tire crown and the new band of rubber to be vulcanized thereto.

The terminal wires 35, 36 (Fig. 4) are carried outside of the heating element by means of a flat cable portion 37 in which they are embedded, part of the flat cable portion extending across the crown of the heating element at an area which includes the juncture 34 of the wire turns. Part of the flat cable portion is vulcanized to the body of the heating element and thus forms part of the crown thereof. The flat cable portion 37 terminates in a round cable portion 38 which extends therefrom for connecting the terminal wires, for example, by means of a suitable plug, with a desired control apparatus. The terminal wires 35, 36 have been shown to extend in straight flights through the flat cable portion 37 in which they are embedded. It will be understood, however that these terminal wires may likewise undulate within the straight cable portion and that they are insulated by glass braid just as the turns 33 which are embedded in the body of the heating element. Mobility of the terminal wires within the flat cable portion is thus fully preserved; the wires are in this manner protected against injury due to rough handling by a tool such as a crowbar.

The manner of carrying the terminal wires 35, 36 from the heating element to the outside, by means of the flat cable portion 37, facilitates the handling incident to insertion of the structure into a tire casing and removal therefrom after completion of the vulcanizing operation. The difficulties experienced in the handling of the terminal wires (21, 22 in Figs. 1 and 2) of the prior arrangement are largely eliminated. This will be appreciated upon considering the ease with which the flat cable portion 37, extending laterally from the heating element, can be handled as compared with the relatively fragile terminal structure such as 21, 22 discussed in connection with Figs. 1 and 2. The flat cable portion 37 is sturdy and can easily be manipulated for disposal between the side wall of the curing tube and the inside wall of the tire casing without inviting damage even with rough handling.

It will be seen from the foregoing that the heating element according to Figs. 3 to 5 forms a unitary structure which is easily assembled with a curing tube for insertion in accurate position within a tire casing to be recapped. The undulating manner in which the wire turns are disposed, and the mobility of the wire at any point thereof, with respect to the surrounding parts, furnishes effective protection against damage while permitting manipulation as required. The wire turns are connected to form within the heating element a coil with continuity of the turns, providing uniform heating throughout 360° and therewith uniform and improved heat transfer to the parts to be heated.

Figure 6:
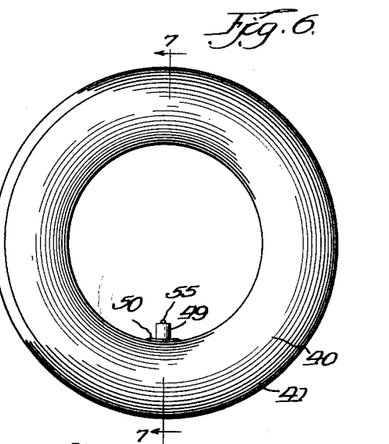
Fig. 6 illustrates in elevational side view a curing tube comprising as an integral part thereof a heating element according to the invention.
Figure 7:
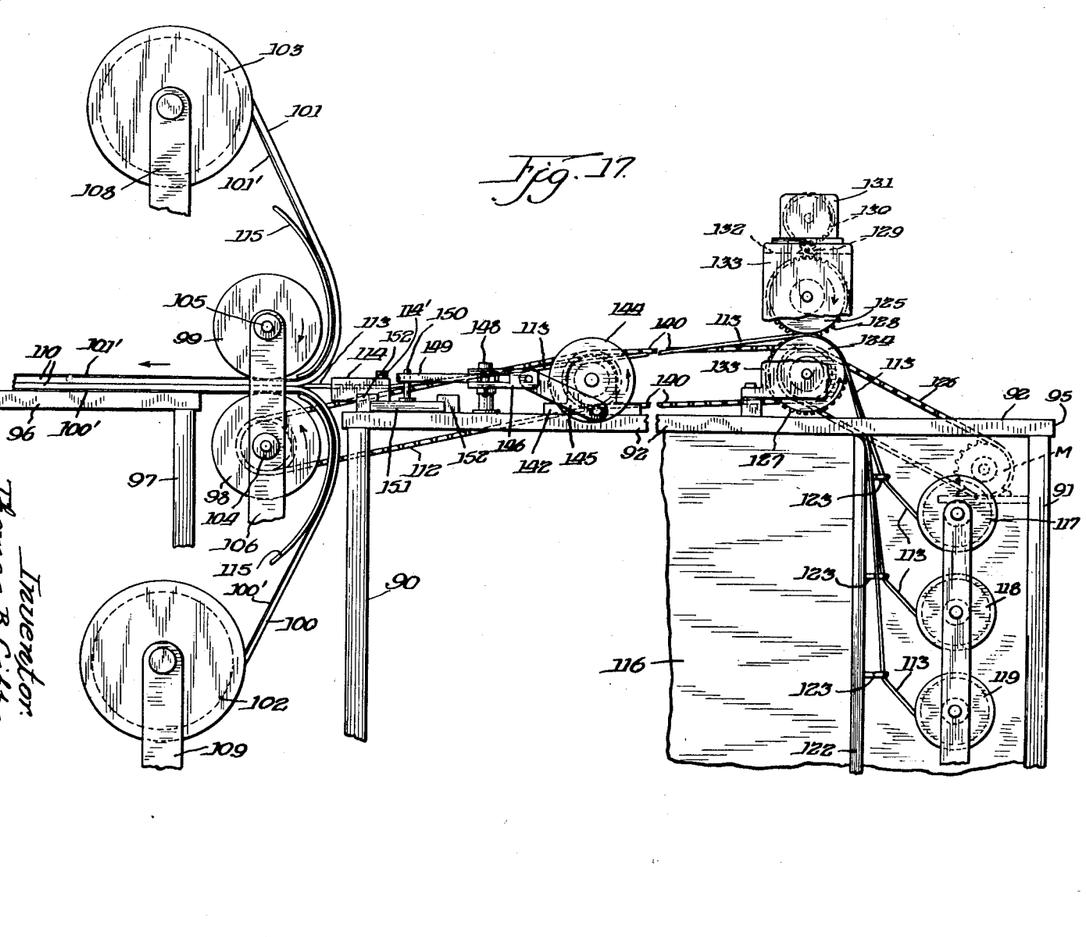

Figs. 6 and 7 show a curing tube comprising as an integral part thereof a heating element according to the invention, which may be substantially similar to the heating element explained with reference to Figs. 3 to 5, except for extending the terminal wires to the outside.

Numeral 40 in Figs. 6 and 7 indicates the curing tube; numeral 41 is the heating element carrying a coil comprising wire turns 42 embedded therein. The heating element 41 is vulcanized to the curing tube, extending circularly along the crown thereof throughout 360°. The wires of the turns are insulated by glass braid and are disposed in undulating fashion just as explained in connection with Figs. 3 to 5. Seven wire turns are schematically indicated in Fig. 7 but more or fewer may, of course, be provided. The turns are joined as in the embodiment according to Figs. 3 to 5 to form a coil with conductively continuous conductor.

The heating element is in this manner combined with a curing tube, forming a unitary structure which is integral therewith. The advantages discussed in connection with the first described embodiment are fully preserved.

As shown in Fig. 7, the terminal wires 45, 46 extending from the coil embedded in the heating element 41, are embedded in the side walls of the curing tube. These terminal wires may likewise extend in undulating fashion and may be insulated by glass braid to preserve mobility thereof and to provide the advantages already discussed. The terminal wires 45, 46 terminate respectively in contacts 47, 48 of a tubular socket 49 made of suitable plastic material and secured in position on the wall of the curing tube 40 by a flange 50 which is vulcanized thereto. The structure of the tubular socket 49 will now be described with reference to Figs. 8 and 9.

Figure 8:
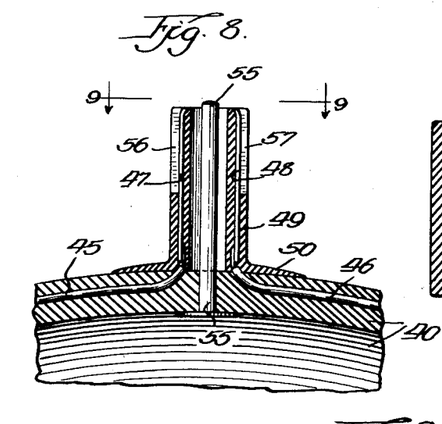
Fig. 8 shows in sectional enlarged view taken along line 8—8 of Fig. 9 the socket portion of the curing tube illustrated in Figs. 6 and 7.
Figure 9:
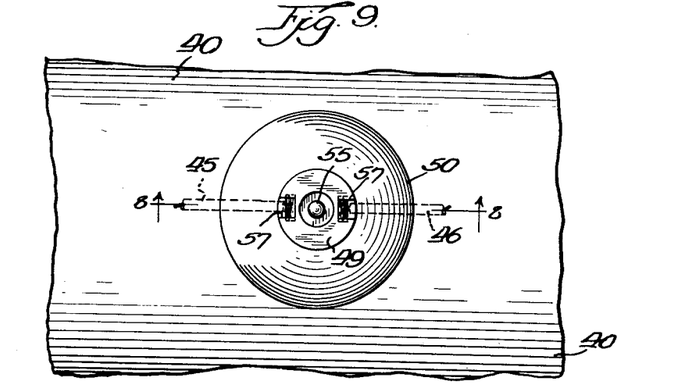
Fig. 9 is a top view of the socket portion of the curing tube, as seen when looking in the direction of the arrows along line 9—9 of Fig. 8.

Referring to Figs. 8 and 9, the socket comprises the tubular body 49 provided with the flange 50 which is vulcanized to the wall 40 of the curing tube. The latter is provided with a customary air valve 55 which thus extends outwardly through the bore of the tubular socket. Slots 56, 57 are formed in the wall of the socket as shown. Two metallic strips 47, 48 are embedded in the wall of the socket forming contacts which are respectively connected with the terminal wires 45, 46. Contact 47 is accessible along the slot 56 and contact 48 is accessible along the slot 57.

The tubular socket 49 disposed around the air valve 55 forms in this manner an integral part of the curing tube, providing a convenient connector for the terminal wires 45, 46 extending from the multiple-turn coil embedded in the heating element 41. There are no loose wires to be handled in manipulating the combination comprising the curing tube and the heating element. The structure is unitary, sturdy and always ready for easy assembly with a tire casing to be recapped.

Figure 10:
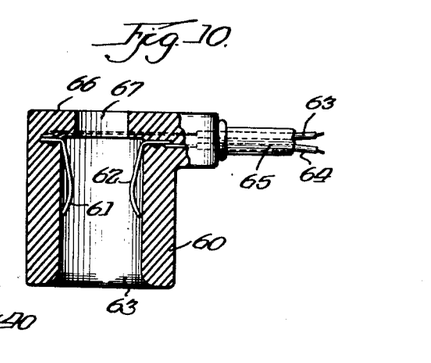
Fig. 10 illustrates in part sectional view the plug for cooperation with the socket of the curing tube.

The plug for cooperation with the tubular socket is shown in Fig. 10. It comprises a tubular body 60 made of suitable plastic material, Bakelite for example, in which are provided two contacts 61, 62 for cooperation with the socket contacts 47, 48. The bore 63 has a diameter slightly larger than the outer diameter of the tubular socket 49. The contacts 61, 62 are connected with conductors 63, 64 contained in the cable 65. A top wall 66 forms a stop for coaction with the upper end of the socket 49 (Figs. 8 and 9) when the tubular plug is put in position on the socket to effect engagement of the plug contacts 61, 62 with the socket contacts 47, 48, thereby extending the terminal wires 45, 46 of the heating element to the leads 63, 64 which may be carried to a suitable control circuit. A bore 67 formed in the top wall 66 of the plug gives access to the air valve 55 of the curing tube.

The structure of the unit of which a heating element is formed will now be described, first with reference to Figs. 11 to 13.

Figure 11:
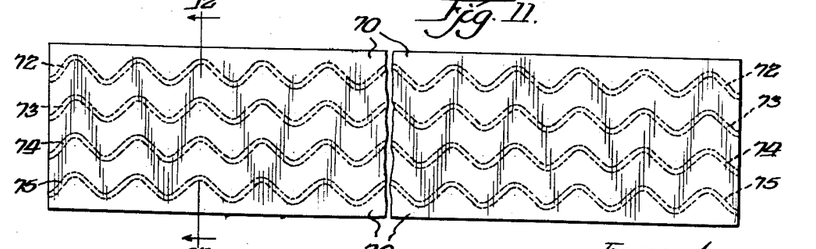
Fig. 11 shows a side elevational view of a band of rubber composed of two sheets between which are embedded heating wires; such band constituting the basic part for making a heating element according to the invention.
Figures 12, 13:
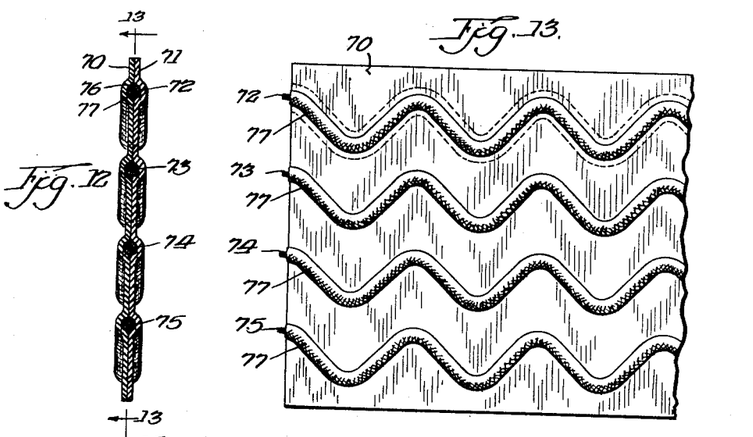
Fig. 12 is an enlarged transverse sectional view of the composite band, taken approximately along line 12—12 of Fig. 11.
Fig. 13 shows in longitudinal sectional view taken along line 13—13 of Fig. 12 a portion of the composite band to illustrate the disposition of the heating wires.

Referring to Figs. 11 to 13, the unit comprises two sheets 70, 71 of rubber in which are embedded four wires 72, 73, 74, 75 which may be, for example, Balco wires, each insulated by two layers 76, 77 of glass braid. The wires extend in undulating fashion in parallel relationship longitudinally of the joined rubber sheets. Four wires have been shown for convenience; more or fewer may be provided as desired. The wires 72 to 75, Figs. 11 to 13, may correspond to the wires respectively indicated in Figs. 3 to 5 and 6 to 7 and respectively marked in these latter figures by numerals 33 and 42.

The disposition of the wires, in undulating fashion longitudinally of the composite rubber sheet indicates but one possible embodiment. The wires may be disposed differently, for example, in transverse flights but, of course, in undulating manner as described. It is likewise possible, and contemplated by the invention, to dispose the wires non-uniformly so as to produce more intense heating of predetermined angular sectors of the tire casing to be processed.

The structure as shown in Fig. 12 would make it appear that the embedded wires produce pronounced undulating ridges projecting outwardly from both sides of the composite rubber sheet. This appearance is due to distortion of relative dimensions adopted for convenience of representation. The rubber sheets 70, 71 are in actual embodiments much wider and somewhat thicker than shown in Figs. 12 and 13 and, while some ridges are produced, they are in actual embodiment of practically negligible depth.

The use of Balco wires, insulated by glass braid, and embedded in the composite rubber sheet as described, secures for the final structure that is to be formed of a unit such as shown in Fig. 11, the previously mentioned advantages, namely, improved heat transfer, relative mobility of the wires with respect to the surrounding rubber as well as mobility thereof with the surrounding rubber, that is, expandability responsive to distortion of the surrounding rubber due to any cause, for example, due to rough handling by tools such as crowbars that may apply to the structure kinking, bending, compressing and expanding stresses in any conceivable direction. The disposition of the wires according to the invention thus furnishes effective protection against damage.

The manner in which a unit such as discussed with reference to Figs. 11 to 13 is processed to form a circular heating element, for example, of the kind shown in Figs. 3 to 5, will now be explained with reference to Figs. 14 to 16.

Figure 14:
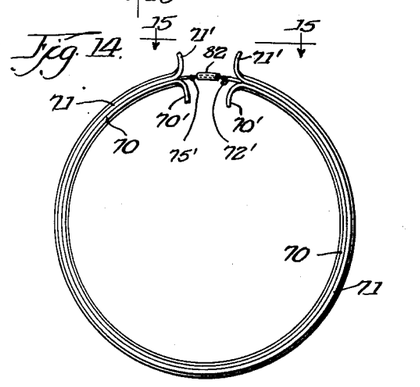
Fig. 14 indicates the manner of joining the wires extending from the opposite ends of the band shown in Figs. 11 to 13.

The elongated band-like structure of Fig. 11 is manipulated to place its ends in mutual alignment, thus producing a hoop-like configuration as shown in Fig. 14, one of the rubber sheets (70) assuming, for example, the inside position and the other sheet (71) the outside position. These sheets are partially peeled off as indicated at 70' and 71' to expose the ends of the wires 72 to 75 which are embedded therebetween. The resulting flaps 70', 71' may be cut off if desired.

Figure 15:
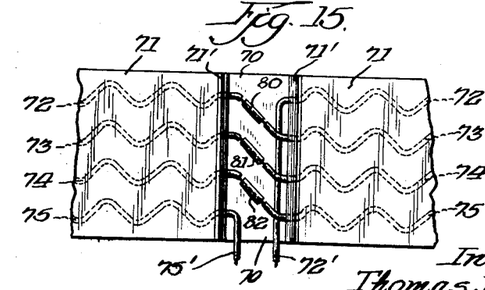
Fig. 15 shows the position of the joined wires as seen when looking in the direction of the arrows along line 15—15 in Fig. 14.

The insulation is in usual manner pushed back or stripped from the ends of the wires and the wires are thereupon joined by sleeves such as 80, 81, 82 as particularly shown in Fig. 15 (see also Fig. 2, in which these sleeves are designated by numeral 34). It will be noted that one end of each of the wires 72, 73, 74 at one end of the structure is respectively joined with an end of the wires 73, 74, 75 at the other, aligned end thereof. Accordingly, sleeve 80 joins the facing ends of wires 72, 73; sleeve 81 joins the facing ends of wires 73, 74; and sleeve 82 joins the facing ends of wires 74, 75. One end 75' of wire 75 and one end 72' of wire 72 remain free, forming the terminal wires.

The manner of joining the wires disposes them for operation as a coil having conductively continuous turns (72, 73, 74, 75) and forms terminal wires 72' and 75'. In the final structure, the coil, when supplied with current, will produce uniform heat throughout 360° of the corresponding heating element.

The sleeves 80, 81, 82 are after completion of the wire-joining operation insulated by glass braid which is suitably secured in place. The glass braid used for this purpose may be separate portions of braid inserted in preparatory position onto the respective wire portions, prior to putting the sleeves in position, or braid that had been pushed back from the ends of the wires to expose them for the joining operation. The joined ends of the wires may be soldered together if desired.

If the flaps 70', 71' (Fig. 14) of the two rubber sheets 70, 71 have been retained, they will be pressed down into original position and the junctures of the wires will thus be embedded therebetween. In case these flaps have been removed, there will be gaps between the facing ends of the rubber sheets on both sides of the junctures including the sleeves 80, 81, 82. These gaps may be closed by strips of raw rubber extending transversally across the junctures on each side thereof.

Having assumed that the final structure should conform to the heating element illustrated in Figs. 3 to 5, there will be needed a terminal cable having respectively the flat portion 37 and the round portion 38, for extending the terminal wires 75' and 72' (Fig. 15) to the outside. This terminal cable is prepared separately. A flat cable portion is made of raw rubber containing two conductors embedded therein, which may extend in undulating fashion as previously explained, and such flat portion 37 is joined to a round portion 38 containing the corresponding conductors.

The flat portion of the terminal cable is placed across the structure shown in Fig. 15 in alignment with the transverse area containing the wire junctures. One of the conductors contained in the flat cable portion is securely connected with the terminal wire 75' and the other conductor is similarly connected with the terminal wire 72'. Suitable metallic sleeves may be used for connecting the terminal conductors, and the corresponding joints are, of course, insulated, for example, in the manner explained with reference to the sleeves 80, 81, 82.

Figure 16:
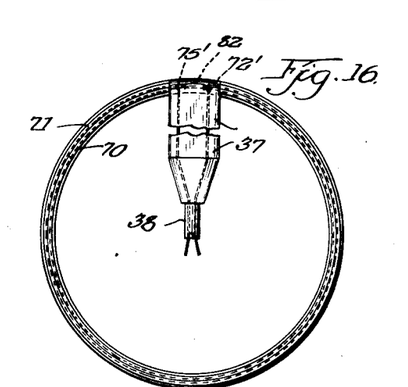
Fig. 16 illustrates the manner in which the terminal cable portion is connected with the band unit after the wires have been joined as indicated in Figs. 14 and 15.

The resulting unit, diagrammatically indicated in Fig. 16, is thereafter processed, by suitable vulcanizing and shaping treatment, to secure the flat cable portion in place transversally of the circular structure on the outside thereof, and to impart to the structure a cross-sectionally arcuate shape with feathered or tapered edges.

The heating element according to Figs. 3 to 5 is now completed; the terminal cable forming an integral part thereof.

The processing of a unit such as discussed with reference to Fig. 11, to join it with a curing tube so as to obtain a structure as shown in Figs. 6 and 7 requires availability of a curing tube having terminal wires (45, 46 in Fig. 7) embedded in the side walls thereof and having a circumferentially extending shallow recess formed therein for receiving the heating unit. Such a tube may be produced by means generally well known in the art. The heating unit, with the wires joined as described in connection with Figs. 14 and 15 is thereupon assembled with the corresponding curing tube and the terminal wires, such as wires 75' and 72' (Fig. 15) are properly joined with the terminal wires 45, 46 embedded in the side walls of the curing tube. The joining of the wires may be effected by steps analogous to those already described.

Figure 18:
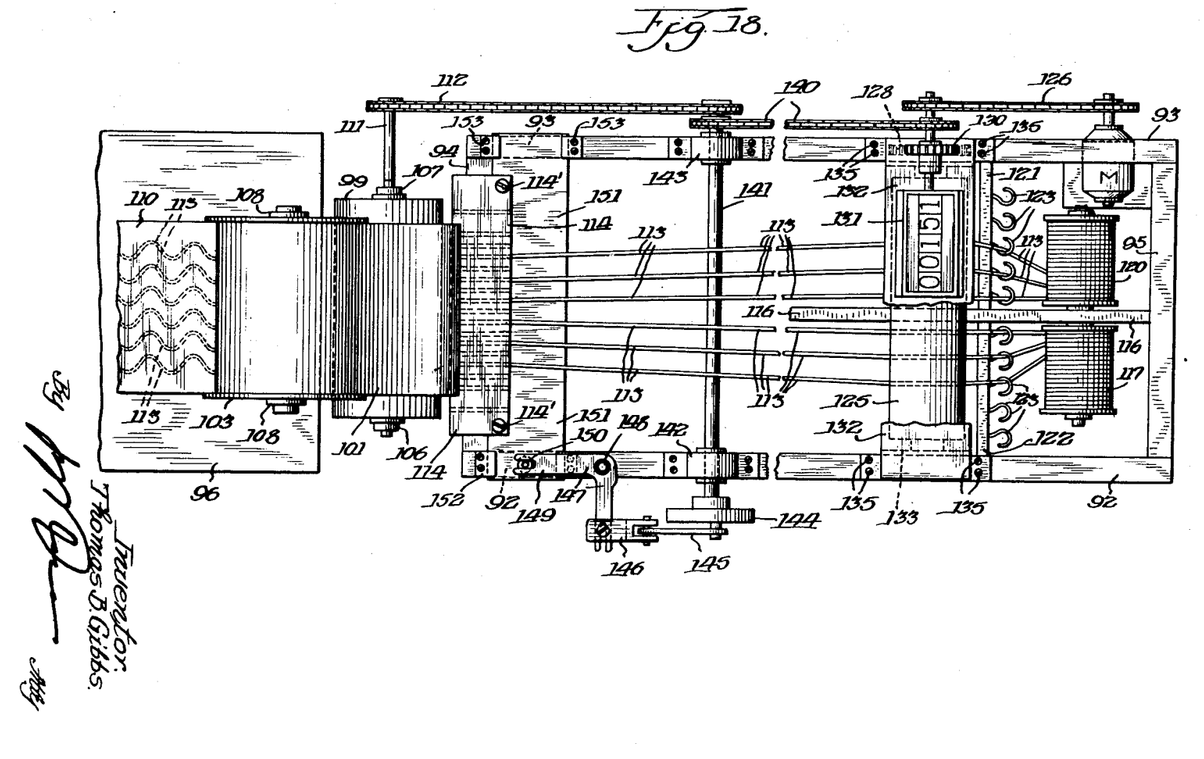
Fig. 18 is an elevational top view of the machine shown in Fig. 17.

Figs. 17 and 18 will be described next. These figures show in diagrammatic manner the salient parts of a machine for producing composite rubber sheets containing wires embedded therein, as shown in Figs. 11 to 13.

The corresponding machine provides a frame comprising legs such as 90, 91 for supporting longitudinally extending members, for example, angle irons 92, 93 suitably joined with cross members 94, 95, one at each end of the longitudinal members, thus forming a stand on which are mounted various component parts. At the left of this stand, spaced therefrom is disposed a table comprising a platform 96 supported on legs such as 97.

Disposed within the space between the stand and the table are two rollers 98, 99 for molding together and advancing two sheets 100, 101 of raw rubber drawn respectively from supply reels 102, 103. Numeral 115 indicates shields over which the rubber sheets are guided to the rollers 98, 99. The rollers 98, 99 are respectively rotatable about axes 104, 105, and the corresponding shafts are supported by means of suitable mounting members, for example, members 106, 107. The shafts forming the axes of the supply reels 102, 103 are supported by means of suitable mounting members indicated respectively at 108, 109. It will be understood that the mounting members 106, 107, 108, 109 may take different form and that they as well as the guide shields 115 may be secured in connection with suitable and desired structural parts of the machine.

The raw rubber sheets 100, 101, are, as is known, tacky; to prevent adhesion of the sheets, one to the other, each sheet is provided with a plastic protecting sheet extending on one side thereof, as indicated in Fig. 17 at 100' and 101'. Rotation of the rollers 98, 99, in the direction of the arrows (Fig. 17) will draw the raw rubber sheets 100, 101 from the supply reels 102, 103, with their tacky sides exposed, and will press these tacky sides together in firm engagement, thus furnishing a composite band of rubber 110 which emerges from the left of the rollers 98, 99 onto the platform 96 of the table. The roller 98 is the drive roller. It is provided with a shaft 111 (Fig. 18) carrying a sprocket driven by a chain 112, shown in Figs. 17 and 18. It is understood, of course, that the rollers 98, 99 may be geared for positive rotation, if desired.

A plurality of glass braid insulated wires 113 are fed to the raw rubber sheets 100, 101 through corresponding holes formed in a bar 114 which is removably mounted on a slide 151 by suitable means, for example, by screws 114'. The slide 151 is movably disposed in brackets 152, 153 carried respectively by the frame members 92, 93. Reciprocation of the slide 151 will reciprocate the apertured bar 114 transversally so as to displace the wires laterally relative to the sheets 100, 101, thereby disposing the wires within the rubber sheets in undulating mutually parallel relationship. Six wires 113 are shown in Fig. 18, but more or fewer may be provided. The reciprocating bar 114 has seventeen guide holes formed therein to provide for structures requiring a greater number of wire turns. It will be seen that the composite rubber sheet 110 emerging from the left of the machine onto the table 96 is a structure to provide for units such as explained with reference to Figs. 11 to 13.

The mechanism providing for the wire feeding, wire reciprocating and for certain control means is shown in Figs. 17 and 18 at the right of the feed rollers 98, 99.

A center board 116 is provided which extends longitudinally to the right hand end of the stand or frame 92—95 forming a partition carrying wire reels 117, 118, 119 on one side thereof and similar wire reels on the other side; one of the latter wire reels being visible in Fig. 18 and marked by numeral 120. It is assumed that there are three wire reels on each side of the center board. More or fewer may, of course, be provided to supply the requisite number of wires 113 to be embedded in a given composite rubber sheet, depending on the size of the heating units to be produced. Cross boards 121, 122 extend from the center board 116 carrying a desired number of eyelets 123 which may be disposed at different levels as shown in Fig. 17. Further eyelets may be similarly disposed on the other, left sides of the cross boards 121, 122 and further wire reels may be likewise disposed on the part of the center board 116 extending to the left of the cross boards 121, 122. These further eyelets and further wire reels have been omitted to keep the drawings simple.

The purpose of the eyelets 123 is to guide the wires 113 to the wire feed rollers 124, 125, these wires then extending to and through the holes formed in the reciprocating bar 114 for undulating insertion between the raw rubber sheets 100, 101.

One of the feed rollers, for example, the feed roller 124, may be rotated through the medium of suitable sprockets, by means of a chain 126 driven from a suitably mounted motor M. The other feed roller 125 may be driven frictionally by the drive roller 124 or positively through the medium of a gear 127 meshing with a gear 128. The gear 128 meshes with a pinion 129 which is in turn in mesh with a gear wheel 130 carried on the shaft extending from a counter 131. The counter 131 is secured on the top wall 132 of a mounting member having side walls 133, 134 secured to the longitudinally extending frame members 92, 93 by means of screws 135 as shown in Fig. 18; the top wall bridging across the space between the longitudinal frame members 92, 93. The wire feed rollers 124, 125 are journalled in suitable and desired bearings in the side walls 133, 134. If desired, the feed rollers 124, 125 may be provided with annular grooves, one for each wire to be advanced from a corresponding wire reel, so as to prevent lateral drifting of the wires during their travel through the feed rollers.

The shaft of one of the feed rollers, for example, the shaft of the feed roller 124 which is rotated by the motor driven chain 126, may be provided with an auxiliary sprocket for driving a chain 140 to rotate by means of another sprocket a shaft 141 which is journalled at 142, 143 and carries an eccentric 144. The latter upon rotating actuates an arm 145 which is linked to a member 146 to rock a bell-crank 147 journalled at 148, one arm of the bell-crank being provided with a fork 149 in engagement with a pin 150 extending from the slide 151.

It will be seen from the foregoing explanations of Figs. 17 and 18 that the motor M will drive the chain 126 to rotate the wire feed rollers 124, 125, the chain 140 at the same time rotating the eccentric 144 and the chain 112 simultaneously rotating the drive roller 98 for the rubber sheets. The glass braid insulated wires 113 will accordingly be drawn from their respective wire reels 117–120 and will be advanced in controlled manner to the bar 114 and individually through the holes in such bar to be fed into the rubber sheets 100, 101 which are at the same time in controlled manner drawn from the supply reels 102, 103. The apertured bar 114 is reciprocated transversally by the rotation of the eccentric 144, thereby moving the wires 113 transversally back and forth just before they are allowed to enter into the rubber sheets 100, 101. The wires are in this way embedded within the two rubber sheets and positioned therein in the undulating mutually parallel relationship described before.

The counter 131 counts the revolutions of the wire feed rollers 124, 125, thereby determining the lengths of the wire turns to be embedded in a unit to be produced for any desired heating element. The length of the wires in turn determines the electrical resistance thereof. Each wire forms in the heating element to be produced a turn of the corresponding coil embedded therein and the electrical resistance of the coil thus is a function of the resistance of the individual wire turns. It follows from these considerations that the reading of the counter, properly interpreted, will furnish information as to the electrical resistance to be provided in any given unit. Assuming that the operation is started with the counter reading 00151, as shown in Fig. 18, and further arbitrarily assuming that the proper length of wire for the unit to be produced (electrical resistance desired) will be provided after a count of 149, the operator will know (and may be guided by suitable tables) that a unit of proper length has been completed when the counter reads 300. The composite rubber sheet 110 emerging from the rollers 98, 99 onto the table 96 may now be properly marked to indicate the useful length of the unit that has been produced. The further processing of such a unit to form a desired heating element therefrom has been explained before.

Known, desired or required control means including switches and the like have been omitted from the drawings to keep them simple.

Modifications may be made.

For example, it may be desired to advance the rubber sheets 100, 101, for instance, for short intervals between useful lengths of units to be produced, without undulating the wires. This may be done by providing suitable clutch means for selectively connecting and disconnecting the drive for the eccentric 144 as desired. Such clutch means may in simple manner be provided for the shaft 141.

The leverage or lever ratio of the bell-crank 147 and the rocking displacement thereof by the arm or linkage 145 actuated by the eccentric 144 determines the amount of lateral reciprocating motion or stroke of the apertured bar 114 and therewith the amplitude of the undulations of the wire within the rubber sheets. Any desired and suitable ratio may, of course, be provided by corresponding dimensioning of the parts. It is, however, likewise possible to provide for an adjustment of the leverage ratio, for example, by suitably adjustably linking the member 146 on the corresponding arm of the bell-crank 147.

The relative speed at which the apertured bar 114 is reciprocated will determine the relative frequency (occurrence) of the undulations of the embedded wires longitudinally of the unit which is being produced. Any desired gearing between the wire feed rollers 124, 125 and the shaft 141 of the eccentric as well as between the shaft 141 and the shaft of the rubber feed roller 98, to provide for the desired relative speeds of the corresponding parts may, of course, be provided. If desired, the speed of reciprocation of the apertured bar 114 may be made adjustable, for example, by the provision of an eccentric such as 144, of desired diameter and provided with an elongated radial slot or slideway for mounting the fulcrum pin for the arm 145 at desired variable radii. Such an arrangement, in the absence of other adjustments, would of course also affect the stroke of reciprocation of the bar 114 and therewith the amplitude of the undulations of the wires; that is, there will result short reciprocating strokes of the bar 114 with increased frequency of undulations of the wires when the fulcrum point for the arm 145 is placed nearest the axis of the eccentric 144, while longer reciprocating strokes with decreased frequency of undulation will result when the fulcrum point is placed farthest away from the eccentric axis. Such operation may in some cases be desirable.

However, since the leverage ratio (stroke of reciprocation) may also be made adjustable, as explained before, either factor may be separately adjusted to produce the relationship between the stroke of reciprocation and speed thereof as may be desired in any given case.

The shafts forming the axes for the rubber feed rollers 98, 99 may be adjustable so as to determine the relative pressure exerted on the rubber sheets 100, 101. The shafts forming the axes for the wire feed rollers 124, 125 may likewise be mounted adjustably if desired.

The invention thus contemplates and provides numerous possibilities for adjusting various factors including those which determine the frequency of the undulations of the wires (relative speed of the rocking motion of the bell-crank 147) and the amplitude (relative amount of the stroke of the apertured bar 114) thereof. Jointly with the speed at which the wires are fed into the rubber sheets, which is likewise adjustable by suitable gearing, these factors will determine the amount of wire (linear length) to be embedded in the rubber sheets, thereby determining the electrical resistance that is to be provided as indicated by the reading of the counter. The rubber feed rollers may be adjusted relative to one another, for processing rubber sheets of various thickness and for determining the pressure exerted on the rubber sheets to be joined. Similar adjusting means for the wire feed rollers will permit the use of wires of different gauge. Rubber sheets of different width may be processed in the machine and the number of wires to be embedded may be as desired or required.

In Fig. 18, six laterally uniformly spaced wires are fed through holes in the reciprocating member 114 into the rubber sheets 100, 101; as has been said before, more or fewer wires may be used. If desired, the wires may be non-uniformly spaced to provide heating elements which supply more heat in some predetermined areas and less in others. For example, a greater number of wires laterally relatively closely spaced, may be fed into the rubber sheets near the edges thereof and fewer wires, laterally differently spaced, may be fed centrally of the sheets.

Several desirably apertured members 114 may be provided, each for a different unit to be made, and each may be exchangeably mounted in place.

The invention may be further modified by forming the heating coil by layers of one continuous wire. This may be done, for example, by first providing an endless raw rubber sheet provided on each side with a protecting plastic sheet such as shown in Fig. 17 at 100' and 101', and advancing such rubber sheet through suitable rollers while feeding thereto a laterally reciprocating single wire to embed such wire in laterally spaced layers between one side of the rubber sheet and the corresponding protecting plastic sheet. The lateral spacing of the wire layers may be controlled manually or in suitable manner automatically. A second rubber sheet may thereafter be fed to the side of the first rubber sheet on which the wire has been placed in laterally spaced layers, while the protecting plastic sheet is simultaneously peeled from the first sheet, so as to embed the wire layers under suitable pressure between the two rubber sheets.

The heating element according to the invention may obviously also be used in making new tires, including tires of the tubeless kind; likewise, in retreading tubeless tires. The invention provides as a further advantage the possibility to repair casing cracks in the tread area while a tire is being retreaded.

Changes may be made within the scope and spirit of the appended claims.

I claim:

1. An apparatus for curing tires in full circle tire vulcanizing molds comprising a curing tube, an electric heating element in the form of a ring positioned between said curing tube and the tire carcass about the circumferential extent of the tread portion of the tire, said element having a body of flexible rubber, a plurality of conductively continuous wire turns each extending in an undulating path within said body, said wire having a tubular insulating sheathing concentrically disposed relative to the wire and extending coextensively with the length of said wire permitting relative movement of said wire with respect to said tubular sheet and terminal means extending from said wire for connecting current thereto.

2. An apparatus according to claim 1 in which said wire and tubular insulating sheathing extend in mutually substantially parallel laterally spaced relationship within said body.

3. An apparatus according to claim 1 in which said body of flexible rubber is integrally assembled with said curing tube.

4. An apparatus as claimed in claim 1 in which said insulating sheathing consists of at least one layer of fabric made of glass.

5. An apparatus as claimed in claim 1 in which the material of the wire forming said turns has a high resistivity at room temperature which rapidly increases as the temperature thereof increases which provides for initial heating to relative high temperature followed by a decrease in current flow through said wire, the heat transferred from said wire turns to said insulating sheathing being predominantly radiant heat and the heat transferred from said insulating sheathing to the surrounding material of said body being predominantly conductive heat.

6. An apparatus as claimed in claim 5 in which said wire comprises Balco wire.

7. An electric heating element for use with a curing tube to be inserted into a tire casing which is to be retreaded, an air valve stem on said tube, said heating element being integrally formed with said curing tube and forming the crown portion thereof, a heating coil embedded in said element comprising a plurality of conductively continuous wire turns and terminal means extending from said coil for connecting current thereto, said terminal means embedded in a side wall of said curing tube, a socket forming an integral part of said curing tube containing contact means connected to said terminal means, said socket being tubular and surrounding the stem of the air valve extending from said curing tube.

8. An apparatus for curing tires in full circle tire vulcanizing molds comprising a curing tube, an electric heating element in the form of a ring positioned between said curing tube and the tire carcass about the circumferential extent of the tread portion of the tire, said element having a body of flexible rubber, a plurality of conductively continuous wire turns each extending in an undulating path within said body, said wire having a tubular insulating sheathing concentrically disposed relative to the wire and extending coextensively with the length of said wire permitting relative movement of said wire with respect to said tubular sheet, terminal means extending from said wire for connecting current thereto, said electric heating element being integrally assembled with said curing tube, said curing tube having an air valve stem extending from the wall of the tube opposite the crown of said tube in a radially inwardly direction, a tubular socket forming an integral part of said curing tube and surrounding the stem of said air valve, and contact means in said socket connected with said terminal means.

9. An apparatus for curing tires in full circle tire vulcaniizng molds comprising a curing tube, an electric heating element in the form of a ring positioned between said curing tube and the tire carcass about the circumferential extent of the tread portion of the tire, said element having a body of flexible rubber, a plurality of conductively continuous wire turns each extending in an undulating path within said body, said wire having a tubular insulating sheathing concentrically disposed relative to the wire and extending coextensively with the length of said wire permitting relative movement of said wire with respect to said tubular sheet, terminal means extending from said wire for connecting current thereto, an air valve extending from said curing tube in a radially inward direction, a tubular socket forming an integral part of said curing tube, said socket surrounding the stem of said air valve, contact means in said socket connected with said terminal means, a tubular plug for cooperation with said socket, contact means disposed within said plug for cooperation with said contact means in said socket, cable means extending from said plug, and conductors contained in said cable means connected with the contact means disposed within said socket.

References Cited in the file of this patent

UNITED STATES PATENTS

| | | |
|---|---|---|
| 926,695 | Frost | June 29, 1909 |
| 1,359,280 | Schwartz | Nov. 16, 1920 |
| 1,839,877 | Heintz | Jan. 5, 1932 |
| 1,844,505 | Heintz | Feb. 9, 1932 |
| 1,881,198 | Kirk | Oct. 4, 1932 |
| 2,180,020 | Schott | Nov. 14, 1939 |
| 2,200,933 | Nystrom et al. | May 14, 1940 |
| 2,510,041 | Rudahl | May 30, 1950 |
| 2,585,443 | Cox | Feb. 12, 1952 |
| 2,610,286 | Cox | Sept. 9, 1952 |
| 2,771,537 | Lichtenstein | Nov. 20, 1956 |
| 2,783,171 | Thiessen | Feb. 26, 1957 |
| 2,801,443 | Duerksen | Aug. 6, 1957 |
| 2,802,091 | MacKendrick | Aug. 6, 1957 |
| 2,809,268 | Heron | Oct. 8, 1957 |